US009392209B1

(12) United States Patent
Kotab (10) Patent No.: US 9,392,209 B1
(45) Date of Patent: Jul. 12, 2016

(54) SYSTEMS AND METHODS FOR RECORDING TELEVISION PROGRAMS (76) Inventor: Dominic M. Kotab, San Jose, CA (US)

( * ) Notice: Subject to any disclaimer, the term of this patent is extended or adjusted under 35 U.S.C. 154(b) by 91 days.

(21) Appl. No.: 13/083,415

(22) Filed: Apr. 8, 2011

Related U.S. Application Data

(60) Provisional application No. 61/322,249, filed on Apr. 8, 2010.

(51) Int. Cl.

| *H04N 5/76* | (2006.01) |
|---|---|
| *H04N 5/445* | (2011.01) |
| *H04N 7/18* | (2006.01) |
| *H04N 7/173* | (2011.01) |
| *H04N 21/231* | (2011.01) |
| *G06F 13/00* | (2006.01) |
| *G06F 15/16* | (2006.01) |
| *H04N 5/781* | (2006.01) |
| *H04N 5/16* | (2006.01) |
| *H04N 5/44* | (2011.01) |
| *H04N 7/10* | (2006.01) |
| *H04L 29/06* | (2006.01) |
| *G06F 12/02* | (2006.01) |
| *G06F 3/06* | (2006.01) |

(52) U.S. Cl.
CPC .................. *H04N 5/76* (2013.01); *H04L 29/06* (2013.01); *H04N 5/165* (2013.01); *H04N 5/4401* (2013.01); *H04N 5/781* (2013.01); *H04N 7/106* (2013.01); *H04N 7/17318* (2013.01); *G06F 3/0601* (2013.01); *G06F 3/067* (2013.01); *G06F 12/0246* (2013.01)

(58) Field of Classification Search
USPC ............. 386/291, E5.001, 299, 292, 293, 386/E5.043; 709/207, 238; 725/86, 44, 46, 725/51, 54, 109, 112, 58, 110, 113, 116, 725/135, 142, 146, 149, 80; 348/E7.054; 711/103, 112, 154, 165; 705/34, 35, 705/89, 100, 134, 135, 142

See application file for complete search history.

(56) References Cited

U.S. PATENT DOCUMENTS

| 5,909,548 | A | 6/1999 | Klein et al. | |
|---|---|---|---|---|
| 6,832,385 | B2 | 12/2004 | Young et al. | |
| 7,369,750 | B2 * | 5/2008 | Cheng et al. | 386/292 |
| 7,403,693 | B2 * | 7/2008 | Shteyn | 386/291 |
| 7,577,336 | B2 | 8/2009 | Srinivasan et al. | |
| 7,917,008 | B1 | 3/2011 | Lee et al. | |
| 8,006,263 | B2 | 8/2011 | Ellis et al. | |
| 8,046,801 | B2 | 10/2011 | Ellis et al. | |
| 8,122,094 | B1 | 2/2012 | Kotab | |
| 8,245,257 | B1 * | 8/2012 | Stettner | 725/54 |
| 8,272,015 | B2 * | 9/2012 | Schwesinger et al. | 725/58 |
| 8,317,618 | B2 | 11/2012 | Malik | |

(Continued)

OTHER PUBLICATIONS

U.S. Appl. No. 12/491,954, filed Jun. 25, 2009.

(Continued)

*Primary Examiner* — Geepy Pe
*Assistant Examiner* — Syed Hasan
(74) *Attorney, Agent, or Firm* — Zilka-Kotab, PC (57) ABSTRACT

In one general embodiment, a method includes, or a system has logic for, receiving a request to record a television program on a first output device; determining that recording the television program conflicts with a scheduled recording; and downloading the television program from a server in response to determining that the recording thereof conflicts with another scheduled recording. Additional systems and methods are also presented.

39 Claims, 6 Drawing Sheets

(56) References Cited

U.S. PATENT DOCUMENTS

| | | | |
|---|---|---|---|
| 8,391,858 | B1 | 3/2013 | Vargantwar et al. |
| 8,588,590 | B1 | 11/2013 | Kotab |
| 8,615,164 | B1 | 12/2013 | Kotab |
| 8,626,178 | B2 | 1/2014 | Johansen |
| 8,661,463 | B2 | 2/2014 | Lee et al. |
| 9,014,535 | B2 | 4/2015 | Klappert et al. |
| 2002/0032907 | A1 | 3/2002 | Daniels |
| 2003/0059202 | A1 | 3/2003 | Yoda |
| 2003/0147630 | A1 | 8/2003 | Kawai et al. |
| 2005/0076390 | A1* | 4/2005 | Klausberger et al. ............... H04N 9/8042 725/134 |
| 2005/0084240 | A1 | 4/2005 | Faisy |
| 2005/0204385 | A1 | 9/2005 | Sull et al. |
| 2006/0136761 | A1* | 6/2006 | Frasier et al. ........... G06F 9/505 713/320 |
| 2007/0107039 | A1* | 5/2007 | Miyakawa et al. H04N 21/4334 725/142 |
| 2007/0127890 | A1 | 6/2007 | Yabuta |
| 2007/0243934 | A1 | 10/2007 | Little et al. |
| 2007/0266414 | A1* | 11/2007 | Kahn et al. .................... 725/113 |
| 2008/0022012 | A1* | 1/2008 | Wang ................ H04L 47/10 709/238 |
| 2008/0066099 | A1* | 3/2008 | Brodersen et al. ................. G06F 17/30038 725/35 |
| 2008/0112686 | A1 | 5/2008 | Chen et al. |
| 2008/0163330 | A1 | 7/2008 | Sparrell |
| 2009/0046988 | A1 | 2/2009 | Kenagy |
| 2009/0052870 | A1 | 2/2009 | Marsh et al. |
| 2009/0167940 | A1 | 7/2009 | Card, II |
| 2009/0182933 | A1* | 7/2009 | Jang et al. ............. G11B 20/10 711/103 |
| 2009/0220216 | A1 | 9/2009 | Marsh et al. |
| 2009/0238543 | A1 | 9/2009 | Guo |
| 2009/0257733 | A1 | 10/2009 | Ellis |
| 2009/0310937 | A1 | 12/2009 | Ellis et al. |
| 2010/0119208 | A1 | 5/2010 | Davis et al. |
| 2010/0135639 | A1 | 6/2010 | Ellis et al. |
| 2010/0158477 | A1 | 6/2010 | Kummer |
| 2010/0202754 | A1* | 8/2010 | Bhogal et al. .................. 386/83 |
| 2010/0205628 | A1 | 8/2010 | Davis et al. |
| 2010/0329644 | A1 | 12/2010 | Rosenfeld |
| 2011/0085781 | A1 | 4/2011 | Olson |
| 2011/0150431 | A1 | 6/2011 | Klappert |
| 2012/0239655 | A1 | 9/2012 | Cok et al. |

OTHER PUBLICATIONS

U.S. Appl. No. 12/362,966, filed Jan. 30, 2009.
Restriction/Election Requirement from U.S. Appl. No. 13/081,446 dated Nov. 9, 2012.
Non-Final Office Action from U.S. Appl. No. 13/081,446 dated Jan. 14, 2013.
Restriction/Election Requirement from U.S. Appl. No. 13/081,438 dated Nov. 14, 2012.
Non-Final Office Action from U.S. Appl. No. 13/081,438 dated Jan. 15, 2013.
U.S. Appl. No. 13/081,438, filed Apr. 6, 2011.
U.S. Appl. No. 13/081,446, filed Apr. 6, 2011.
Notice of Allowance and Fee(s) Due from U.S. Appl. No. 13/081,438 dated Sep. 10, 2013.
Supplemental Notice of Allowance from U.S. Appl. No. 13/081,438 dated Oct. 16, 2013.
Notice of Allowance and Fee(s) Due from U.S. Appl. No. 13/081,446 dated Sep. 9, 2013.
Supplemental Notice of Allowance from U.S. Appl. No. 13/081,446 dated Oct. 16, 2013.
U.S. Appl. No. 14/054,779, filed Oct. 15, 2013.
Supplemental Notice of Allowability from U.S. Appl. No. 13/081,438, dated Nov. 8, 2013.
Non-Final Office Action from U.S. Appl. No. 14/054,775, dated Nov. 14, 2014.
Non-Final Office Action from U.S. Appl. No. 14/054,779, dated Nov. 14, 2014.
Non-Final Office Action from U.S. Appl. No. 14/078,419, dated Dec. 2, 2014.
Non-Final Office Action from U.S. Appl. No. 14/085,395, dated Jan. 21, 2015.
Kotab, D., U.S. Appl. No. 14/054,779, filed Oct. 15, 2013.
Kotab, D., U.S. Appl. No. 14/078,419, filed Nov. 12, 2013.
Kotab, D., U.S. Appl. No. 14/085,395, filed Nov. 20, 2013.
Final Office Action from U.S. Appl. No. 14/054,775, dated Apr. 7, 2015.
Final Office Action from U.S. Appl. No. 14/054,779, dated Apr. 6, 2015.
Kotab, D., U.S. Appl. No. 12/612,559, filed Nov. 4, 2009.
Final Office Action from U.S. Appl. No. 14/085,395, dated Jun. 15, 2015.
Final Office Action from U.S. Appl. No. 14/078,419, dated Jun. 15, 2015.
Kotab, D., U.S. Appl. No. 14/054,775, filed Oct. 15, 2013.
Kotab, D., U.S. Appl. No. 12/491,954, filed Jun. 25, 2009.
Non-Final Office Action from U.S. Appl. No. 13/083,415, dated Sep. 24, 2015.
Non-Final Office Action from U.S. Appl. No. 14/078,419, dated Oct. 8, 2015.
Non-Final Office Action from U.S. Appl. No. 14/054,775, dated Jan. 4, 2016.
Non-Final Office Action from U.S. Appl. No. 14/054,779, dated Jan. 20, 2016.

* cited by examiner

FIG. 6

SYSTEMS AND METHODS FOR RECORDING TELEVISION PROGRAMS

RELATED APPLICATION

This application claims priority to U.S. Provisional Patent Appl. No. 61/322,249, filed Apr. 8, 2010, which is herein incorporated by reference.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items may be numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

In one general embodiment, a method includes, or a system has logic for, receiving a request to record a television program on a first output device; determining that recording the television program conflicts with a scheduled recording; and downloading the television program from a server in response to determining that the recording thereof conflicts with another scheduled recording.

In one general embodiment, a method includes, or a system has logic for, receiving a request to record a television program on a first output device; determining that recording the television program conflicts with a scheduled recording; determining that a program associated with the scheduled recording is available for download; downloading the program associated with the scheduled recording; and recording the television program instead of the performing the scheduled recording.

In one general embodiment, a method includes, or a system has logic for, determining that a first desired recording of a television program on a first recording device conflicts with a second desired recording; determining that the television program is assigned a lower recording priority than a program associated with the second scheduled recording; and downloading the television program from a server.

In one general embodiment, a method includes, or a system has logic for, determining that a first desired recording of a television program on a first recording device conflicts with a second desired recording; determining that the television program is assigned a higher recording priority than a program associated with the second desired recording; downloading the program associated with the second desired recording; and performing the first desired recording instead of performing the second desired recording.

Figure 1:
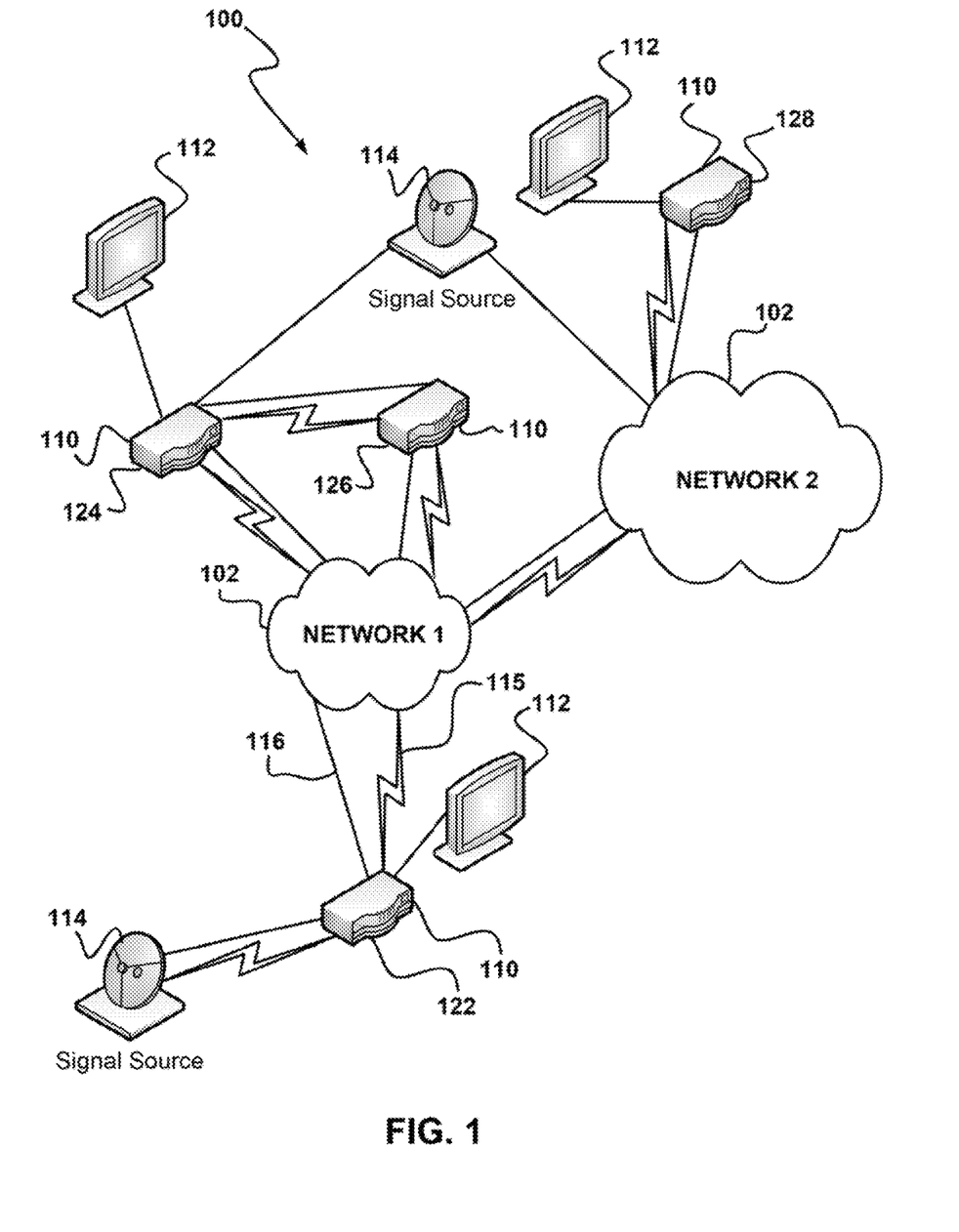
FIG. 1 is a schematic diagram of a network system, showing multiple output devices capable of communicating with each other, according to one embodiment.

FIG. 1 is a schematic diagram of a network including multiple output devices, such as one or more of a Digital Video Recorder (DVR), set top box, personal computer, etc. and combinations thereof according to one embodiment. The network architecture 100, in accordance with one embodiment, may include one or more networks 102. In the context of the present network architecture 100, the networks 102 may each take any form including, but not limited, to a local area network (LAN), a wireless network (e.g., Wi-Fi) or link (e.g., Bluetooth), a wide area network (WAN) such as the Internet, cable television network, telephony network, peer-to-peer network, satellite-based network, etc. In addition, more than one network may be included under each network 102. Moreover, the architecture 100 shown may include more or fewer components than those shown, in various embodiments. Also, wireless links 115 and hardwired links 116 are shown to illustrate that a connection may include one or both types of links 115, 116, as discussed below.

Coupled to at least one of the networks 102 is an output device 110. In the example shown, several output devices are present, namely a DVR 122 and a television tuner box (also known in the art as a set top box, tuner, decoder, receiver, etc.) without recording, capabilities 124, and potentially a third and fourth output device 126, 128. The output devices may communicate with each other via the networks 102. Also, or alternatively, some or all of the output devices may communicate with each other directly, as shown for output devices 124 and 126. Any communication protocol may be used in such communication, including protocols known in the art. The information communicated between the output devices may include one or more of video data from a signal source, video data stored on one of the output devices, video files, pictures, audio, etc. For example, the tuner box 124 or a DVR 126 may output a television program that was recorded on DVR 122, data corresponding to the television program being streamed to the tuner box 124 or DVR 126, and/or transferred to the DVR 126 for storage thereon.

Furthermore, each output device 110 is preferably capable of being placed in communication with a display 112. The display 112 may be a television, a computer monitor, a video projector, or any type of display.

Figure 2:
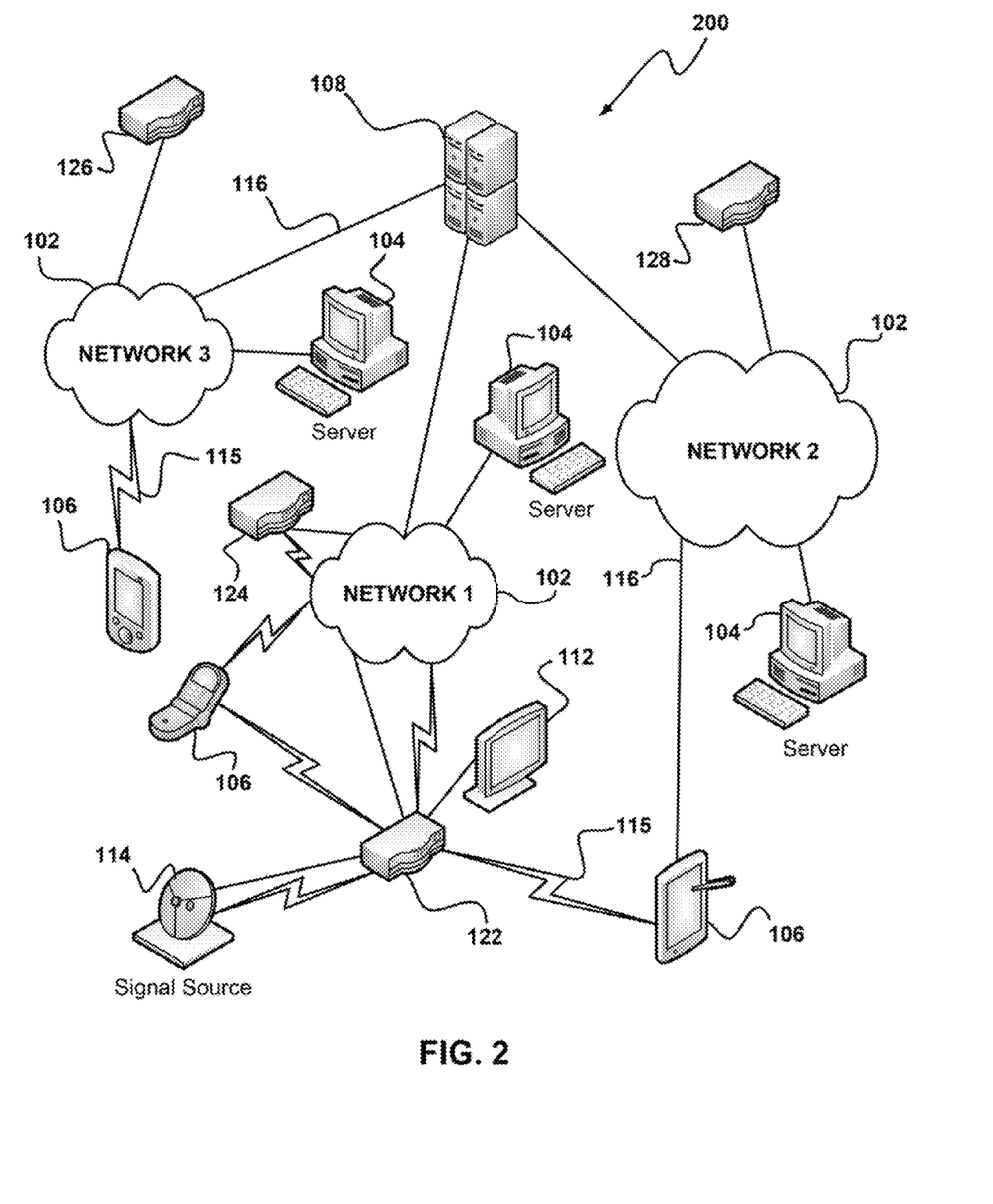
FIG. 2 is a schematic diagram of a network system, showing multiple output devices capable of communicating with each other, according to another embodiment.

FIG. 2 is a schematic diagram of a network architecture including multiple output devices and various handheld devices and servers according to one embodiment. The network architecture 200, in accordance with one embodiment, may include a plurality of networks 102, and various features of the architecture 100 of FIG. 1. In the context of the present network architecture 200, the networks 102 may each take any form including, but not limited, to a local area network (LAN), a wireless network (e.g., Wi-Fi) or link (e.g., Bluetooth), a wide area network (WAN) such as the Internet, cable television network, telephony network, peer-to-peer network, etc. In addition, more than one network may be included under each network 102. Moreover, the architecture 200 shown may include more or fewer components than those shown, in various embodiments.

Coupled to the networks 102 are servers 104 which are capable of communicating over the networks 102. Also coupled to the networks 102 and the servers 104 is a plurality of clients 106. Such servers 104 may include a mainframe computer, network appliance, desktop computer, lap-top computer, hand-held computer, mobile phone, smart phone, and other types of mobile media devices (with or without telephone capability), personal digital assistant (PDA), peripheral (e.g. printer, etc.), network server (e.g., an on-demand server of a content provider, web server, etc.) providing content that may be transmitted to an output device via one or more networks, any component of a computer, and/or any other type of logic. In order to facilitate communication among the networks 102, at least one gateway 108 is optionally coupled therebetween. The at least one gateway 108 may be a router, server, computer, etc., configured such that communications between connected devices is enacted (possibly faster, easier, with different operating systems, etc.).

The communication lines 115 indicate wireless connections, while the communication lines 116 indicate hardwired connections. These communication types are shown for illustrative purposes only, and should in no way limit the scope of the invention, e.g., any connection can be hardwired, wireless or a combination of both. For instance, a client 106 may communicate with a network 102 wirelessly 115, as shown in Network 1, or a client 106 may communicate with a network 102 via hardwired connections 116, as shown in Network 2.

A hardwired connection may be any connection which uses a wire, cord, cable, etc., to connect devices together and allow communications between such devices. Some illustrative hardwire connections include Ethernet, serial, USB, parallel, FIREWIRE, etc. A wireless connection may be any connection which uses a wireless communication technique with which to communicate between two or more devices, possibly over a distance. Some illustrative wireless connections include radio frequency (RF) communication (such as Wi-Fi, Bluetooth, W-LAN, mobile telephony network—3G, CDMA, etc.), microwave communication, satellite communication (such as Global Positioning Satellite—GPS), infrared (IR) communication, etc.

In the context of the network architecture 100, an output device 110, such as a Digital Video Recorder (DVR), tuner box, computer system, tape-based recording system, etc., may be integrated and/or employed in the network architecture 100 that is capable of recording video content, transmitting content via wireless and/or wired techniques, and communicating with various handheld devices wirelessly and through network communications such as wireless telephone systems, Bluetooth, Wi-Fi, etc. As shown, the output device 110 may be placed in communication with a network 102 either wirelessly or through hardwiring, or be placed in communication with a client 106, such as a handheld device, wirelessly. Additionally, the output device 110 may be any type of device that is capable of receiving and recording video data, such as a digital video recorder (DVR), a computer with a TV-in card, an iPOD, an iPHONE, a BLACKBERRY device, a SLINGBOX device, etc. An output device may include additional functionality, such as Internet access, wireless networking, external memory storage interface, etc. The output device may be a standalone unit or integrated with an intermediary device, such as a cable receiver, set top box, satellite receiver, etc.

In particularly preferred embodiments, the methods set forth herein are performed by an output device.

Furthermore, the output device 110 is capable of being placed in communication with a display 112. The display 112 may be a television, a computer monitor, a video projector, or any type of display. Such connection may be a direct connection, connection via network, connection via an additional device or devices, etc., and combinations thereof. In addition, the output device 110 is capable of being placed in communication with a signal source 114. The signal source 114 may include any entity or device capable of providing a video signal to the output device 110. For example, the signal source 114 may be an antenna receiving a signal from a television tower, a satellite signal, a satellite signal receiver, a satellite antenna, a video camera, a cable company's transmitter, a cable box, a digital set top box, a computer broadcasting network, another receiving device, etc.

In some embodiments, the output device 110 may be placed in communication with a client 106. The client 106 may include a desktop computer, lap-top computer, hand-held computer, mobile phone, personal digital assistant (PDA), network appliance, computer readable memory, digital music player, peripheral (e.g. printer, etc.), any component of a computer, and/or any other type of logic. The client 106 may communicate with the output device 110 wirelessly.

More information regarding functionality of an output device 110 with other devices such as client 106, servers 104, etc. can be found in U.S. patent application Ser. No. 12/491, 954 to Kotab, filed Jun. 25, 2009, which is herein incorporated by reference.

Several methods will not be described. As an option, such methods may be implemented in the context of the architecture and environment of FIGS. 1 and/or 2. Of course, however, the methods may be carried out in any desired environment. Moreover, operations from the various methods may be combined in any desired manner to provide additional embodiments and permutations of the present invention. Also, while much of the following description refers to two output devices having recording capabilities, it is to be understood that the teachings also apply to systems having one or more output devices capable of recording and one or more output devices not capable of recording.

A method according to one embodiment includes, or a system according to one embodiment has logic for, receiving a request to record a television program (the television program may include a single program, a series of programs, a special program, etc.). The request may be received by one of the output devices, a local server, a remote server, a website, a webpage, a workstation, a television, etc. This request to record a television program may be initiated on a handheld device (such as a mobile telephone, a personal media player (such as an APPLE iPOD, a MICROSOFT ZUNE, etc.), a universal remote control, etc.), on the Internet (such as through a website, a webpage, an email program, etc.), directly through a user interface with an output device, etc. Moreover, any method may be used to receive a request to record a television program, including receiving selection of a program from a guide output on a display device, website, webpage, etc.; receiving an instruction as a result of a search query; receiving a calendared request to record the program, etc. Additional examples, which may be implemented in various embodiments, are disclosed in U.S. patent application Ser. No. 12/612,559 to Kotab, filed Nov. 4, 2009, and which is herein incorporated by reference.

Further; the television program may be any type of programming related to television, in some approaches. For example, the television program may be from subscription programming, pay-per-view (PPV) programming, public broadcast programming, television programs broadcast over the Internet, YOUTUBE television content, iTUNES store television content, Internet-based original content, etc. Furthermore, the television program may be formatted in any manner, such as by any of the following standards from the Motion Picture Editors Guild (MPEG, MPEG-2, MPEG-4), DivX, Xvid, FFmpeg, Windows Media Video (WMV), National Television System Committee (NTSC), Advanced Television Systems Committee (ATSC), THEORA, QuickTime (.mov), Audio Video Interleave (AVI), high definition (HD) 3D standards, etc.

The television program may be received through hardwired and/or wireless connections. Further, the connections may include an intermediary device, such as a cable box, a set top box, a satellite antenna box, another device (such as a video cassette recorder (VCR), digital video disc (DVD) player/recorder, BLU-RAY player/recorder, camcorder, gaming console—such as SONY PLAYSTATION 3, MICROSOFT XBOX, etc.), an aerial antenna, a computer equipped with a TV-in card, a network appliance, etc. This intermediary device may receive the television program from a service provider, such as a cable television service, a satellite television service provider, an online content provider, an Internet service provider, a website, a webpage, etc.

In some embodiments, the intermediary device may receive the signal from a remote source or from a local receiver. For example, in one embodiment, a cable box may receive a digital or analog television signal through a coaxial cable. In another embodiment, a satellite dish may receive a digital or analog television signal from a satellite transmitter. In yet another embodiment, a network appliance may receive a digital signal from a Wi-Fi network. In still another embodiment, an antenna may receive an analog or digital terrestrial television signal from a transmitter. However, the television program may be received in the intermediary device in any manner, and the intermediary device may be integrated with the receiving device, in some approaches.

An amount of available storage space on each of at least two output devices is determined in one approach. Any known method may be used to determine the amount of available storage space. In one approach, a storage manager may be queried to determine an amount of storage space that is marked as available for receiving data. In another approach, a total amount of space available, that may generally be output to a display device, e.g., to show a user how much capacity remains on the output device, may be shown. In other approaches, a remaining amount of space and/or a used amount of space may be output, such as on a display device (e.g., a monitor, an LCD screen on a mobile device, etc.), on a visual meter (e.g., a series of LCD lights which display a circular gauge, a linear gauge, etc.), etc.

In this and other embodiments, determining an amount of available storage space may include determining an amount of free and/or overwritable storage space. The amounts may be actual, e.g., 120 GB available for writing to, or relative, e.g., 25% free space. In other approaches, determining the amount of available storage space may include determining an amount of used storage space. The amounts may be actual, e.g., 380 GB of 500 GB used, or relative, e.g., 75% used space.

One of the output devices is selected to store a representation of the television program on a computer readable medium associated with the respective output device based on the determined amounts of available storage space on each of the at least two output devices, in one embodiment. The representation may be a copy, a compressed file, a native format duplicate, etc. The selected output device stores the representation of the television program, e.g., on a recording medium such as a hard disk drive (HDD), a Flash memory, a random access memory (RAM), etc. In one approach, the output device having the most available storage space may be selected for storing the representation of the television program. In another approach, the output device may be selected based on some other criteria, as would be known to one of skill in the art, such as availability, speed, processing capacity, etc.

A representation of the television program may be stored (e.g., digital and/or analog) on a computer readable medium, such as a diskette, a Secure Digital (SD) Card, a SONY MEMORY STICK, a CD-ROM, a DVD-ROM, a BLU-RAY disc, ROM, FLASH memory, HDD, etc. The representation may be a duplicate, copy, or clone of the program as received from the source (e.g., raw data, data derived from the incoming signal, a reassembly of the program from incoming packets of data, etc.), a compressed version of the received program, a converted version of the received program (e.g., for compatibility with a handheld device, to maximize storage space, to reduce processing demands, etc.), an upconverted version of the received program (e.g., upconverting standard definition broadcasting 480i/p to 720i, 720p, 1080i, 1080p, etc.), and combinations thereof, etc. The present description may refer to recording and/or storing a television program. This statement is equivalent and interchangeable with recording and/or storing a representation of the television program.

The output device may be selected without user input regarding the selection, in some embodiments. In other approaches, user input may be solicited, such as user-confirmation of the selection, etc. In further approaches, parameters and designations for selecting the output device(s) may be received from a user. Of course, in any embodiment, user input may be solicited, and if not received or not received in a predetermined period of time, a default selection may be followed.

In this and other embodiments, at least one of the output devices may be a digital video recorder (DVR). In some embodiments, both of the output devices may be DVRs.

In preferred embodiments, the representation of the television program stored on the selected output device may be viewable from another of the output devices. For example, in this and any other embodiment, the television program data may be streamed or otherwise transferred from the output device on which it is recorded to a second output device, e.g., via a network and/or direct connection, for output by the second output device. In another approach, the representation of the program, in whole or in part, may be transferred to a second output device and stored thereon. Moreover, in some approaches, identities of television programs stored on the selected output device may be viewable from another of the output devices. For example, in this and any other embodiment, the television programs stored on a first output device may be viewable, selectable, transferrable, deletable, accessible, etc., from a second output device, e.g., in a list output by the second output device to a display device. Such list in this or any other embodiment may include a merged list or separate lists showing which programs are stored on which output device, etc. In some approaches, a cover art, a title page, a thumbnail picture, etc., may be displayed that is representative of each television program stored on either output device, such that a user can quickly and conveniently search and access a desired stored television program.

A method according to another embodiment includes, or a system according to one embodiment has logic for, receiving a request to record a television program. The request and how it is received may be of any type, such as any one of the many exemplary types disclosed elsewhere herein.

An approximate or actual amount of storage space needed to record previously-scheduled television programs on a first output device may be determined, according to one approach. Such previously-scheduled television programs may be determined from a "to do" list or queue, etc., of the first output device. The amount of storage space may be approximated based on any factor or set of factors, such as length of the program, data size of previously-stored versions of programs in a series to which the requested program belongs, a data size received from the source of the program, a running time of the program, a compression ratio of the program, a definition of the program (e.g., 480i, 1080i, 1080p, etc.), etc. In some embodiments, determining an amount of needed storage space includes estimating and/or determining an amount of data associated with the previously-scheduled television programs. The amount may be actual, e.g., 120 GB of data, or relative, e.g., will use 15% of the total available space.

Similarly, an approximate or actual amount of storage space needed to record previously-scheduled television programs on a second output device may be determined.

One of the output devices may be selected, with or without further user input, to store a representation of the television program on a computer readable medium associated with the respective output device based on the determined amounts of needed storage space on each of the output devices, where the selected output device stores the representation of the television program.

In one approach, an amount of available storage space on each of the output devices may be determined, and the selecting may further include determining whether a data size of the requested television program and the previously-requested television programs exceeds the amount of available storage space on each of the output devices. If the total data size exceeds the amount of available storage space on the first output device but not on the second output device, then the program may be recorded on the second output device. If the total data size exceeds the available space on both output devices, the program may be stored on the device that received the request, the user may be queried as to where to store the program, the program may be stored to the output device having the most space available, the oldest recorded program (which can be deleted, with or without user input), etc.

In another approach, an amount of available storage space on each of the output devices may be determined, and the output device having the most available storage space may be selected for storing the representation of the television program. Further, the television program may be recording across both output devices, such that a portion is recorded on the first output device and a portion is recorded on the second output device. The user can then watch the show in its entirety, since each output device may access the content stored on the other output device to output.

In yet another approach, if one or both output devices do not have adequate free space to record the programs scheduled in a queue or "to do" list to record, one or both output devices may search for alternate broadcast formats of the chosen television program from which to record the chosen television programs. For example, if a football game is selected to be recorded in 1080i high definition (HD), but there is not enough space on either output device to store the entire football game in this HD format, then a standard definition (SD) broadcast may be chosen instead, and recorded by the output device(s).

In preferred embodiments, the representation of the television program stored on the selected output device may be viewable from another of the output devices. For example, in this and any other embodiment, the television program data may be streamed or otherwise transferred from the output device on which it is recorded to a second output device, e.g., via a network and/or direct connection, for output by the second output device, manipulation by the second output device, transfer by the second output device, etc. In another approach, the representation of the program, in whole or in part, may be transferred to a second output device and stored thereon. Moreover, in some approaches, identities of television programs stored on the selected output device may be viewable from the other output devices. For example, in this and any other embodiment, the television programs stored on a first output device may be viewable, selectable, transferrable, deletable, accessible, etc. from a second output device, e.g., in a list output by the second output device to a display device, etc. In some approaches, a cover art, a title page, a thumbnail picture, etc., may be displayed that is representative of each television program stored on either output device, such that a user can quickly and conveniently search and access a desired stored television program.

A method according to another embodiment includes, or a system according to one embodiment has logic for, receiving a request to record a television program. The request may be of any type, and how the request is received may be via any technique, such as any one of the many exemplary types disclosed elsewhere herein.

A determination is made as to whether completing a recording of the television program may conflict with a previously-scheduled recording on a first output device, in one approach. Such previously-scheduled recording may be determined from a "to do" list or queue, etc., of the first output device. For output devices having multiple tuners, and one tuner is available though the other tuner may be scheduled for use during the requested program, no conflict arises because the available tuner can be used, thereby avoiding the conflict. However, if all tuners are scheduled for use, then a conflict arises.

Recording of the television program may be scheduled on the first output device if the recording does not conflict with a previously-scheduled recording on the first output device. If there is a conflict, then the recording may be scheduled to occur at a later time when a conflict will not arise, based on a later broadcast of the television program to be recorded.

A request to schedule recording of the television program on a second output device may be sent if the recording conflicts with a previously-scheduled recording on the first output device.

Preferably, the second output device schedules recording of the television program upon receiving the request. However, a notification may be received from the second output device that the recording conflicts with a previously-scheduled recording on the second output device. Preferably, in such an event, a request for further instructions for recording the television program may be output. The request may include options such as canceling the request to record the television program, recording the television program at a later time, recording the television program on an alternate broadcast, etc., may be sent to a user. An alternate broadcast of the same television program may include, but is not limited to, broadcasts on other networks (ABC versus NBC, etc.), broadcasts at different times (10:30 PM versus 7:30 PM, etc.), broadcasts in different definitions (1080i versus 720p, etc.), broadcasts from different service providers (satellite service provider versus cable service provider, television programming available over the Internet versus television programming providers, etc.), etc. For example, if a television program conflicts with other scheduled recordings and cannot be recorded as scheduled, it may be downloaded from the Internet immediately or at a later time when there is space available on one or both output devices.

The foregoing method may be performed by the first output device, where the first output device sends the request to schedule recording of the television program on the second output device to the second output device. Moreover, in some embodiments, the determining, scheduling, and/or sending operations may be performed without user input. The receiving operation, of course, may include receiving user input or operating under default settings in the case of a lack of user input.

In preferred embodiments, the representation of the television program stored on one output device may be viewable from another of the output devices. For example, in this and any other embodiment, the television program data may be streamed or otherwise transferred from the output device on which it is stored to a second output device, e.g., via a network and/or direct connection, for output and/or manipulation by the second output device. In another approach, the representation of the program, in whole or in part, may be transferred to a second output device and stored thereon. Moreover, in some approaches, identities of television programs stored on the selected output device may be viewable from another of the output devices. For example, in this and any other embodiment, the television programs stored on a first output device may be viewable, selectable, transferrable, deletable, accessible, etc. from a second output device, e.g., in a list output by the second output device to a display device. In some approaches, a cover art, a title page, a thumbnail picture, etc., may be displayed that is representative of each television program stored on either output device, such that a user can quickly and conveniently search and access a desired stored television program.

A method according to another embodiment includes, or a system according to one embodiment has logic for, determining an amount of available storage space on each of at least two output devices. Again, any method for determining the amount of available storage space may be used.

Stored video data may be transferred from a first of the output devices to a second of the output devices having more available storage space than the first of the output devices. The transferred video data in any embodiment may be a clone, copy, duplicate, or replication of the data originally stored, a reduced quality or size version thereof, etc., for example, as described in U.S. patent application Ser. No. 12/362,966 to Kotab, filed Jan. 30, 2009, which is herein incorporated by reference.

The video data may be stored on the second output device and made available for later output, and the video data may be deleted from the first output device during or after the transferring. Among other things, this procedure opens up more recording space on the first output device, thereby allowing the first output device to operate as a primary storage device, while the second output device captures overflow storage needs.

In one approach, the stored video data may be selected for transfer to provide about a same relative amount of storage space on the first and second output devices after the transfer. For example, a first DVR may have 10% space available and a second DVR may have 40% space available before the transfer. After the transfer, both DVRs may have 25% space available.

In another approach, the stored video data may be selected for transfer to increase an amount of available storage space on the first output device to at least a predetermined level. For example, the system may be set to keep at least 10% free space on the first DVR. When the first DVR has less than 10% free space, the foregoing process may occur automatically to transfer sufficient program data to the second DVR to provide the desired 10% free space availability on the first DVR.

In some embodiments, the stored video data may be transferred upon determining that a present or future recording operation will use more storage space than the available amount of storage space. For example, the process may be automatically invoked when the first DVR will, has, or is about to exceed a total amount of available storage space. Rather than requiring deletion of a previously-recorded program, e.g., the oldest program not flagged to keep, or not recording the currently-requested program, one or more stored television programs may be transferred to a second DVR for storage thereon. This may include the program being presently recorded. That way, the transferred program is not lost but remains available for viewing.

In one approach, the second output device has a higher total data storage capacity than the first output device, and the data is transferred to the second output device because it has more capacity. For example, the second output device may have a 2 GB hard drive, while the first output device has a 500 MB hard drive.

In one embodiment, the process or system may further include receiving a selection of the stored video data for transfer; determining amounts of available storage space that each of the at least two output devices would have after transfer of the selected video data; outputting the amounts of available storage space that each of the at least two output devices would have after transfer of the selected video data; and receiving a further instruction to perform the transfer.

In another embodiment, the process or system may further include receiving a selection of the stored video data for transfer; determining amounts of available storage space that each of the at least two output devices would have after transfer of the selected video data; outputting the amounts of available storage space that each of the at least two output devices would have after transfer of the selected video data; receiving selection of different stored video data for transfer; determining and outputting amounts of available storage space that each of the at least two output devices would have after transfer of the selected different video data; and receiving a further instruction to perform the transfer. Note that the different video data may be video data other than the video data first selected, or may include some or all of the video data first selected, along with newly-selected data.

In a particularly preferred approach, the output device having the most available storage space may be selected for storing the representation of the television program.

In preferred embodiments, the representation of the television program stored on one output device is viewable from another of the output devices. For example, in this and any other embodiment, the television program data may be streamed or otherwise transferred from the output device on which it is stored to a second output device, e.g., via a network and/or direct connection, for output by the second output device. In another approach, the representation of the program, in whole or in part, may be transferred to a second output device and stored thereon. Moreover, in some approaches, identities of television programs stored on the selected output device are viewable from the another of the output devices. For example, in this and any other embodiment, the television programs stored on a first output device may be viewable, selectable, transferrable, deletable, accessible, etc., from a second output device, e.g., in a list output by the second output device to a display device. In some approaches, a cover art, a title page, a thumbnail picture, etc., may be displayed that is representative of each television program stored on either output device, such that a user can quickly and conveniently search and access a desired stored television program.

The determining and transferring may be initiated without user input in one approach. For example, the method may be performed upon some triggering event, such as when an output device determines that the storage capacity thereof is running low; at a predetermined time (e.g., scheduled maintenance); etc. In another approach, the method may be initiated upon receiving a user request.

A method according to another embodiment includes, or a system according to one embodiment has logic for, receiving a request to transfer a stored representation of a television program from a first output device to a second output device, the first and second output devices communicating with each other using a direct connection between the output devices or over a local area network to which they are directly coupled.

The stored representation is transferred from the first output device to the second output device, where the representation is stored on the second output device and made available for later output. The video data may automatically (i.e., without further user input) be deleted from the first output device during or after the transferring.

As an option, an amount of available storage space on each of the output devices may be determined, and the amount of available storage space on each of the output devices may be output, such as by displaying, transferring, copying, etc.

In preferred embodiments, the representation of the television program stored on the second output device may be viewable from the first output device. For example, in this and any other embodiment, the television program data may be streamed or otherwise transferred from the second output device on which it is stored to the first output device, e.g., via a network and/or direct connection, for output by the first output device, e.g., to a television set, monitor, etc. In another approach, the representation of the program, in whole or in part, may be transferred to a second output device and stored thereon. Moreover, in some approaches, identities of television programs stored on the selected output device are viewable from the another of the output devices. For example, in this and any other embodiment, the television programs stored on a first output device may be viewable, selectable, transferrable, deletable, accessible, etc. from a second output device, e.g., in a list output by the second output device to a display device. In some approaches, a cover art, a title page, a thumbnail picture, etc., may be displayed that is representative of each television program stored on either output device, such that a user can quickly and conveniently search and access a desired stored television program.

A method according to another embodiment includes, or a system according to one embodiment has logic for, receiving a request to record a television program. The request may be of any type and how it is received may through any method, such as any one of the many exemplary types disclosed elsewhere herein.

An amount of available storage space on each of at least two output devices may be determined. Again, any technique may be used to estimate the available storage space, including the exemplary methods disclosed herein.

The amounts of available storage space on each of the output devices may be output and/or may be shared across each output device.

A request for selection of one of the output devices for recording the television program may be presented to a user for selection thereof, according to one embodiment.

A reply to the request for selection may be received, e.g., from a user, and the reply may indicate a selection of one of the output devices for recording and/or accessing thereof according to another embodiment.

The selected output device may be instructed to record the television program, in one embodiment.

In preferred embodiments, a representation of the television program stored on the second output device is viewable from the first output device. For example, in this and any other embodiment, the television program data may be streamed or otherwise transferred from the output device on which it is stored to another output device, e.g., via a network and/or direct connection, for output by the other output device. In another approach, the representation of the program, in whole or in part, may be transferred to a second output device and stored thereon. Moreover, in some approaches, identities of television programs stored on the second output device are viewable from the first output device. For example, in this and any other embodiment, the television programs stored on a first output device may be viewable, selectable, transferrable, deletable, accessible, etc., from a second output device and vice versa, e.g., in a list output by the output device to a display device. In some approaches, a cover art, a title page, a thumbnail picture, etc., may be displayed that is representative of each television program stored on either output device, such that a user can quickly and conveniently search and access a desired stored television program.

A method according to another embodiment includes, or a system according to one embodiment has logic for, determining an amount of available storage space on a first output device.

A determination may be made as to whether a size of video data associated with a present or future recording operation exceeds the amount of available storage space, in one embodiment.

If it is determined that the size of the video data associated with a present or future recording operation exceeds the amount of available storage space, previously-stored video data may be selected for transfer to a second output device, e.g., to make room for the new recording, and/or deleted from the first output device, in some embodiments.

The selected video data is transferred from the first output device to the second output device, where the transferred video data is stored on the second output device and made available for later output. As an option, the selected video data may not be transferred to the second output device if the second output device does not have an amount of available storage space that is at least as great as a data size of the selected video data. In such case, other video data may be selected for transfer, video data may be deleted from the first output device, etc. For example, the oldest recording not flagged to keep may be deleted. In another embodiment, a priority setting may dictate which video data is deleted and/or transferred. In another embodiment, duplicate recordings of television programs may be identified and one or more copies of the duplicate recordings may be deleted to maximize free space.

In one approach, the previously-stored video data is selected based on an amount of available storage space on the second output device. For example, if the size of a first program is 4 GB and the size of a second program is 12 GB, and the second output device has 10 GB of free space, the first program may be transferred. On the other hand, if the second output device has 100 GB of free space, the larger program may be selected to provide more available free space on the first output device.

The selected video data may be deleted from the first output device during or after the transferring. The deleting may be performed by marking or listing the media space where the video data was stored as available for data storage, allowing overwriting of the transferred video data, etc. This procedure opens up more recording space on the first output device without requiring absolute deletion of the video data.

In preferred embodiments, a television program associated with the video data transferred to the second output device may be viewable from the first output device. For example, in this and any other embodiment, the television program data may be streamed or otherwise transferred from the output device on which it is stored to another output device, e.g., via a network and/or direct connection, for output by the other output device, e.g., viewing on a display, outputting via HDMI to another device, etc. In another approach, the representation of the program, in whole or in part, may be transferred to a second output device and stored thereon. In alternative approaches, the storage may occur on a device connected to the second output device, such as a portable HDD, a SD card, a USB drive, etc. Moreover, in some approaches, identities of television programs stored on the second output device may be viewable from the first output device. For example, in this and any other embodiment, the television programs stored on a first output device may be viewable, selectable, transferrable, deletable, accessible, etc., from a second output device and vice versa, e.g., in a list output by the output device to a display device. In some approaches, a cover art, a title page, a thumbnail picture, etc., may be displayed that is representative of each television program stored on either output device, such that a user can quickly and conveniently search and access a desired stored television program.

The following description discloses several exemplary methods according to additional embodiments. Such methods may be performed in conjunction with any type of system. Moreover, permutations of the methods may include combinations of features from any of the methodology presented herein. Systems according to various embodiments may have logic for performing one or more of the operations of the methods and the many permutations thereof. As an option, such methods and/or systems may be implemented in the context of the architecture and environment of FIGS. 1 and/or 2. Of course, however, the methods and/or systems may be carried out in any desired environment. Moreover, operations and/or logic from the various embodiments may be combined in any desired manner to provide additional embodiments and permutations of the present invention.

Figure 3:
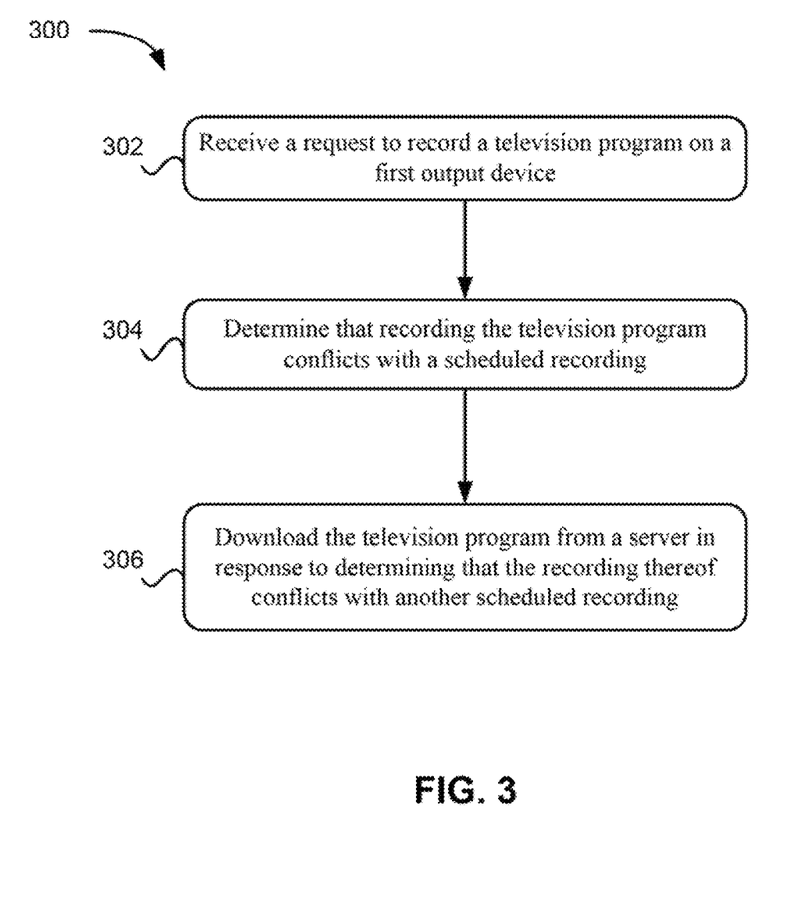
FIG. 3 is a flowchart depicting a system according to one embodiment.

A method 300 according to one embodiment depicted in FIG. 3 includes, or a system according to one embodiment has logic for, receiving a request to record a television program on a first output device. See operation 302. Again, any type of request may be received, including the types noted elsewhere herein. Moreover, the first output device may be a recording device as described herein such as a DVR, a set top box in communication with a local storage device, etc.

A determination is made as to whether recording the television program conflicts with a scheduled recording. See operation 304. Such a conflict may arise, for example, when all tuners of the first output device are expected to be in use at some point during the time slot of the requested program. If it is determined that the recording does not conflict with another scheduled recording, then the television program can be recorded on the first output device. This may include recording the requested program at the same or a different time slot than the time slot requested, etc.

If the recordings conflict, then the television program may be downloaded from a server rather than recording it from the television signal (e.g., over the air signal, satellite signal, cable signal, etc.) in response to determining that the recording thereof conflicts with another scheduled recording. See operation 306. In particularly preferred approaches, the method 300 is performed by the first output device, with or without human intervention.

An indication of the conflicting scheduled recording may be output, e.g., the name of the program to be recorded, its length, etc. Moreover, user input indicating whether or not to cancel the scheduled recording may be received. If the user instruction is to cancel the scheduled recording, the requested program may be recorded instead. In another approach, the option to determine availability for download and/or actually download the program associated with the scheduled recording may be presented to the user. In yet another approach, the availability of one or both of the conflicting programs for download may be performed automatically upon detecting the conflict, and an option to download one or both of the programs may be presented to the user.

A request for approval to search for the requested television program for downloading thereof may be output. For example, the interface output to the display device may say something like "The requested program conflicts with a previously scheduled recording. Search for downloadable version?" and present a "Yes" and "No" option. If a "yes" response is received, e.g., from the user, and if the requested program is found, then it may be automatically downloaded, the option to download it may be presented and the download performed if a user response to download the program is received, etc.

In one approach, an indication of availability of the requested television program for downloading thereof may be output. A remote server may be contacted to determine whether the requested television program is available for download, and if so (or if not), the indication of availability is output indicating the appropriate availability information. For example, the interface may say something like "The requested program is available for download. Would you like to download it?" and present a "Yes" and "No" option. The program may be downloadable for free, or a charge may apply (e.g., a one-time charge, or as part of a subscription). In the latter case, an indication of a cost associated with downloading the requested television program may be presented. For example, the interface may say something like "The requested program is available for download for $2.99. Would you like to download it?" and present a "Yes" and "No" option. In another approach, the cost may be presented elsewhere, such as along with program information, as a second request, etc.

Figure 4:
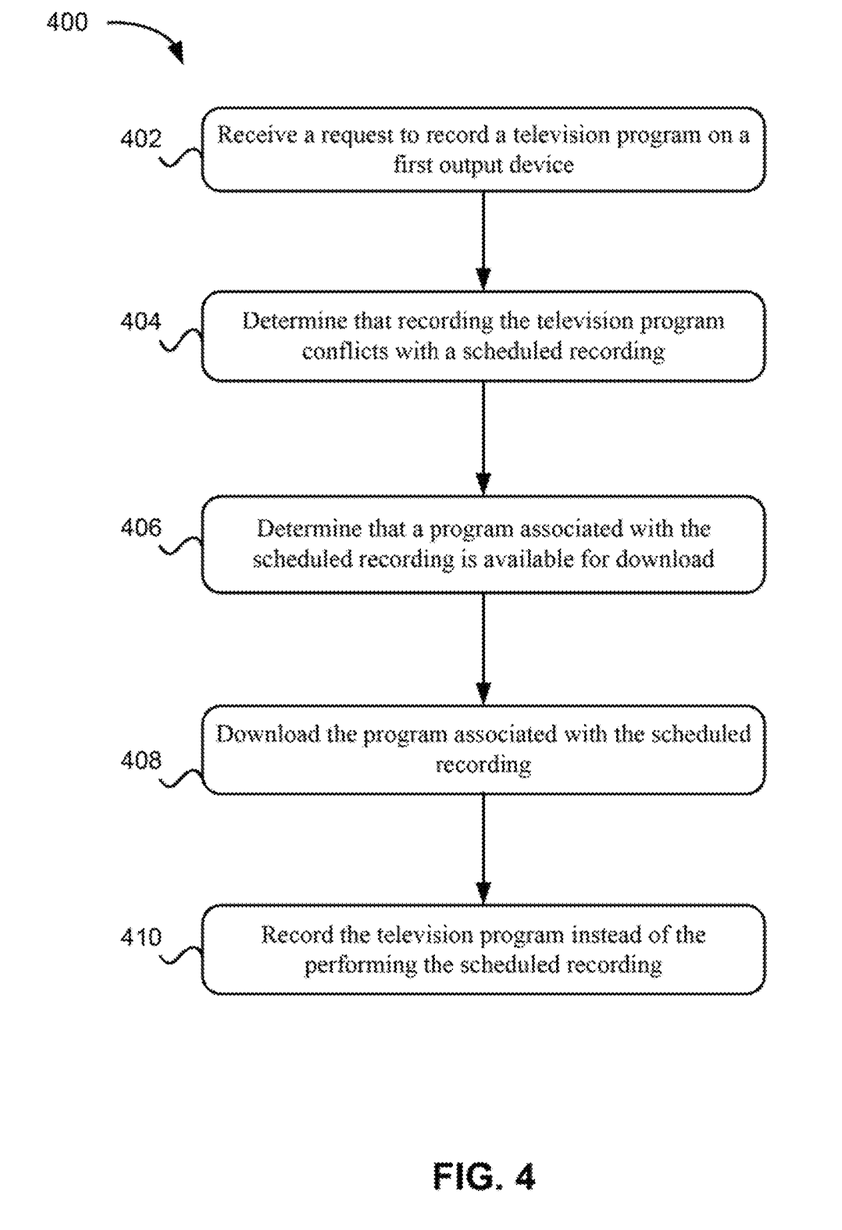
FIG. 4 is a flowchart depicting a system according to one embodiment.

A method 400, or a system having logic for performing the method, according to another embodiment depicted in FIG. 4 is similar to the foregoing method, except that the program associated with the scheduled recording is downloaded. Note that a system in some embodiments may perform both methods, or a hybrid of the two. The method includes receiving a request to record a television program on a first output device. See operation 402. A determination is made as to whether recording the television program conflicts with a scheduled recording. See operation 404. If there is no conflict, the requested program may be recorded. If there is a conflict, a determination is made as to whether a program associated with the scheduled recording is available for download; e.g., from an on-demand server, web server, etc. See operation 406. This may include a future availability, such as where the system knows that the program will be made available on a server or site the day after it was originally broadcast. If it is available, the program associated with the scheduled recording is downloaded, and the requested television program is recorded instead of performing the scheduled recording. See operation 408 and 410.

An indication of the conflicting scheduled recording, e.g., the name of the program to be recorded, its length, etc. may be output. User input indicating whether or not to cancel the scheduled recording may be received.

A request for approval to search for the program associated with the scheduled recording for downloading thereof may be output.

In a further approach, an indication of availability of the program associated with the scheduled recording for downloading thereof may be output. The interface may say something like "The program is available for download. Would you like to cancel the recording and download it instead?" and present a "Yes" and "No" option. The program may be downloaded for free, or a charge may apply. In another approach, an indication of a cost associated with downloading the program may be output. The interface may say something like "The program is available for download for $1.99. Would you like to cancel the scheduled recording and download it instead?" and present a "Yes" and "No" option. In another approach, the cost may be presented elsewhere, such as along with program information, as a second request, etc.

Figure 5:
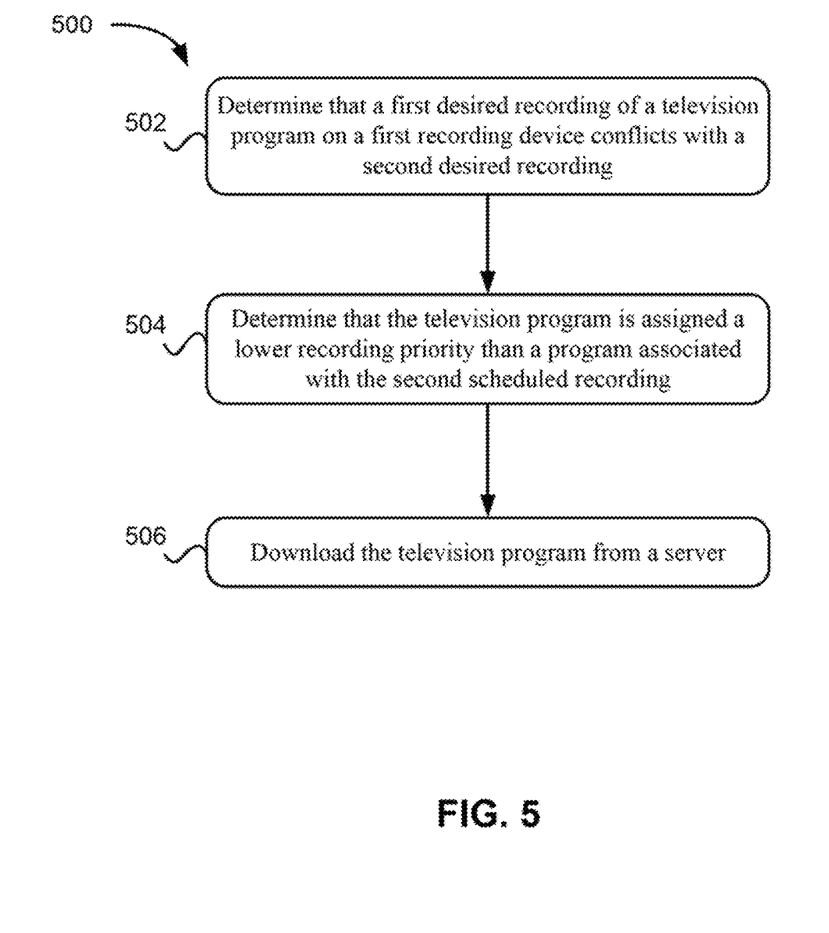
FIG. 5 is a flowchart depicting a system according to one embodiment.

A method 500 according to one embodiment depicted in FIG. 5 includes or a system according to one embodiment has logic for, determining that a first desired recording of a television program on a first recording device conflicts with a second desired recording. See operation 502. For example, the desired recordings) may be requested by a user of the first recording device or a second recording device; requested by a scheduling system of the first recording device based on a setting to record all or all new episodes of the program, all programs in the series, programs associated with a keyword; etc. The television program may be recorded if it is determined that the first desired recording does not conflict with the second desired recording. As an option, if there is a conflict, an indication of the conflict may be output, and user input may be received with further instructions, such as indicating whether or not to cancel the second desired recording.

A determination is made as to whether the television program is assigned a lower recording priority than a program associated with the second scheduled recording. See operation 504. If it has a lower priority, the television program is downloaded from a server. See operation 506. The second desired recording may be performed.

A request for approval to search for the television program for downloading thereof may be output.

An indication of availability of the television program associated with the first desired recording for downloading thereof may be output. The interface may say something like "The requested program is available for download. Would you like to download it?" and present a "Yes" and "No" option. The program may be downloaded for free, or a charge may apply. In the latter case, an indication of a cost associated with downloading the television program may be output. The interface may say something like "The requested program is available for download for $2.99. Would you like to download it?" and present a "Yes" and "No" option. In another approach, the cost may be presented elsewhere, such as along with program information, as a second request, etc.

Figure 6:
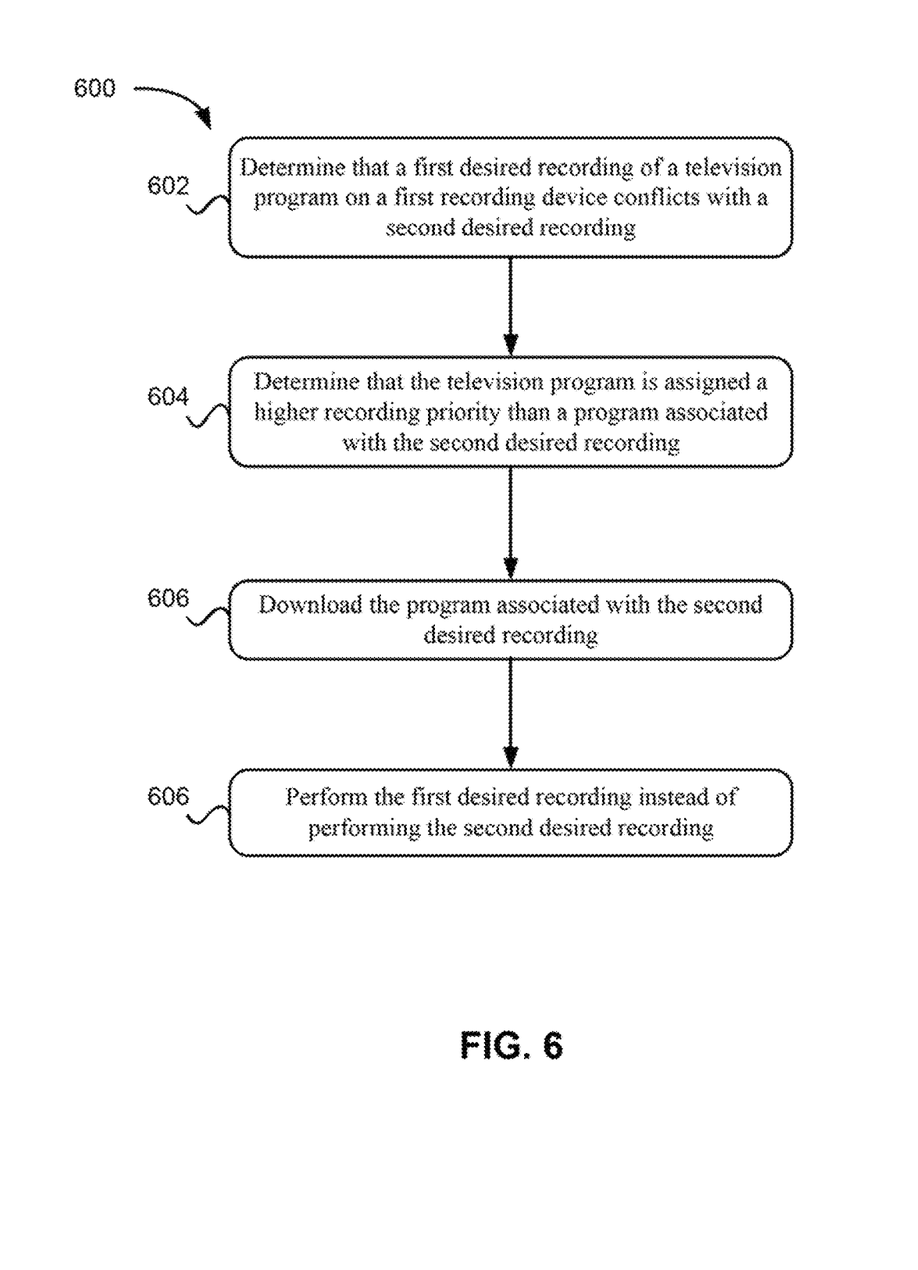
FIG. 6 is a flowchart depicting a system according to one embodiment.

A method 600 according to yet another embodiment depicted in FIG. 6 includes, or a system according to one embodiment has logic for, includes determining that a first desired recording of a television program on a first recording device conflicts with a second desired recording. See operation 602. For example, the desired recording(s) may be requested by a user of the first recording device or a second recording device; requested by a scheduling system of the first recording device based on a setting to record all or all new episodes of the program, all programs in the series, programs associated with a keyword; etc.

A determination is made as to whether the television program is assigned a higher recording priority than a program associated with the second desired recording. See operation 604. If it has a higher priority, the program associated with the second desired recording is downloaded. See operation 606. The first desired recording is performed instead of performing the second desired recording. See operation 608. If it is determined that the first desired recording does not conflict with the second desired recording, the second desired recording is performed.

An indication of the conflict may be output, and user input may be received indicating whether or not to perform the first desired recording, etc.

In one approach, a request for approval to search for the program associated with the second desired recording for downloading thereof.

An indication of availability of the program associated with the second desired recording for downloading thereof may be output. The interface may say something like "The requested program is available for download. Would you like to download it?" and present a "Yes" and "No" option. The program may be downloaded for free, or a charge may apply. Moreover, an indication of a cost associated with downloading the program associated with the second desired recording may be output. The interface may say something like "The requested program is available for download for $2.99. Would you like to download it?" and present a "Yes" and "No" option. In another approach, the cost may be presented elsewhere, such as along with program information, as a second request, etc.

As noted elsewhere herein, television programs stored on one output device may be viewable from another output device.

In various embodiments, the methodology presented herein may be performed by an output device that is receiving instructions directly from a user, e.g., via a remote control, etc. In other approaches, the methodology presented herein may be performed at least in part on a second output device that is receiving instructions directly from a user, the second output device providing instructions to the first output device to initiate some or all of the steps at the first output device.

While the present invention has been illustrated and described with reference to specific embodiments, further modification and improvements will occur to those skilled in the art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented in logic using a variety of technologies. For example, the systems and methods described herein may be implemented at least in part in software logic running on a computer system, processor, etc., In other approaches, the methods and systems may be implemented at least in part in hardware logic utilizing either a microprocessor or other specially designed application specific integrated circuits, programmable logic devices, and/or various combinations thereof. In particular, methods described herein may be implemented by a series of computer-executable instructions residing on a storage medium such as a disk drive, memory (RAM and/or ROM), or computer readable medium such as a physical computer readable storage medium, etc. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of an output device.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Additionally, some or all of the aforementioned code may be embodied on any computer readable storage media including tape, FLASH memory, system memory, hard drive, etc. Additionally, a data signal embodied in a carrier wave (e.g., in a network including the Internet) can be the computer readable storage medium.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A system, comprising:
logic configured to receive a request to record a first television program on a first output device;
logic configured to determine that recording the television program conflicts with a scheduled recording of a second television program;
logic configured to determine that the first television program is assigned a lower recording priority than the second television program, wherein the first television program and the second television program each relate to different television programs;
logic configured to output a request for approval to search for the first television program for downloading thereof;
logic configured to search for the first television program for downloading thereof in response to receiving approval for the search;
logic configured to output an indication of availability of the first television program for downloading thereof simultaneously with a cost associated with downloading the first television program;
logic configured to download the first television program from a server to the first output device;
logic configured to perform, on the first output device, the scheduled recording of the second television program;
logic configured to store the downloaded first television program and the recorded second television program on a storage device operatively coupled to the first output device;
logic configured to determine an available storage capacity of the first output device and a second output device;
logic configured to facilitate a transfer of at least a portion of the downloaded first television program and/or at least a portion of the recorded second television program from the first output device to a second output device to provide a same amount of storage space on the first output device and the second output after the transfer; and
the storage device for storing the downloaded first television program and the recorded second television program.

2. The system of claim 1, wherein the first output device and the second output device are each a digital video recorder.

3. The system of claim 1, further comprising logic configured to: output an indication that the scheduled recording of the second television program conflicts with the requested recording of the first television program; and receive user input indicating whether or not to cancel the scheduled recording of the second television program.

4. The system of claim 1, wherein the request to record the first television program is received by the first output device.

5. The system of claim 1, wherein the request to record the first television program is received by a website.

6. The system of claim 1, wherein the downloaded first television program stored and the recorded second television program are viewable from the first output device and the second output device, the second output device being in communication with the first output device.

7. The system of claim 6, wherein the request to record the first television program is received by the second output device.

8. The system of claim 6, wherein identities of all television programs stored on the first output device and identities of all television programs stored on the second output device are viewable in a merged list from the first output device and the second output device, wherein one or more of the television programs stored on the first output device are different than the television programs stored on the second output device.

9. The system of claim 1, further comprising logic configured to output an indication of the available storage capacity of the first output device and the second output device.

10. The system of claim 1, further comprising logic configured to record the first television program when it is determined that the recording thereof does not conflict with another scheduled recordings of at television program.

11. The system of claim 1, wherein the logic configured to download the first television program from the server is configured to cause the downloading without human intervention.

12. The system of claim 1, further comprising logic configured to request approval to download the first television program from the server.

13. The system of claim 1, wherein the scheduled recording of the second television program is performed at a time when the second television program is broadcast from a signal source, wherein the first television program is downloaded at a later time.

14. The system of claim 1, wherein the second output device has a higher data storage capacity than the first storage device.

15. The system of claim 1, wherein downloading the first television program occurs at a time after the recorded second television program has been stored.

16. The system of claim 1, wherein the at least a portion of the downloaded first television program and/or the at least a portion of the recorded second television program is transferred in response to a determination that the storage capacity of the first output device is below a predetermined threshold.

17. The system of claim 16, wherein the predetermined threshold corresponds to about 10% available storage space.

18. The system of claim 1, wherein a portion of the downloaded first television program and/or a portion of the recorded second television program remains on the first output device.

19. A system, comprising:
   logic configured to receive a request to record a first television program on a first output device;
   logic configured to determine that recording the first television program conflicts with a scheduled recording of a second television program;
   logic configured to output a request for approval to search for the second television program for downloading thereof;
   logic configured to search for the second television program in response to receiving the approval to search;
   logic configured to output an indication of availability of the second television for downloading thereof in response to identifying that the second television program is available for download;
   logic configured to output a cost associated with downloading the second television program, wherein the output of the cost associated with downloading the second television program is output simultaneously with the indication of availability of the second television program for downloading thereof;
   logic configured to output a request for approval to download the second television program to the first output device;
   logic configured to perform a download of the second television program to the first output device;
   logic configured to record, on the first output device, the first television program instead of performing the scheduled recording of the second television program;
   logic configured to store the downloaded second television program and the recorded first television program on the first output device on a storage medium operatively coupled to the first output device;
   logic configured to facilitate a transfer of at least a portion of the downloaded second television program and/or at least a portion of the recorded first television program from the first output device to a second output device to provide a same amount of storage space on the first output device and the second output after the transfer; and
   the storage medium for storing the downloaded second television program and the recorded first television program,
   wherein the first output device and the second output device are each a digital video recorder.

20. The system of claim 19, further comprising logic configured to: output an indication that the recording of the first television program conflicts with the scheduled recording of the second television program; and receive user input indicating whether or not to cancel the scheduled recording.

21. The system of claim 19, wherein the request to record the first television program is received by the first output device.

22. The system of claim 19, wherein the request to record the first television program is received by a website.

23. The system of claim 19, wherein the recorded first television program and the downloaded second television program are viewable from the first output device and the second output device, the second output device being in communication with the first output device.

24. The system of claim 23, wherein the request to record the first television program is received by the second output device.

25. The system of claim 23, further comprising logic configured to output a merged list comprising identities of all television programs stored on the first output device and identities of all television programs stored on the second output device, wherein the merged list is viewable from the first output device and the second output device, wherein one or more of the television programs stored on the first output device are different than the television programs stored on the second output device.

26. The system of claim 19, wherein the logic configured to download the second television program causes the second television program to be downloaded via an Internet connection, and wherein the first television program is recorded at a time that the first television program is broadcast from a signal source.

27. The system of claim 19, further comprising logic configured to: determine an available storage capacity of the first output device and a second output device; and output an indication of the available storage capacity of the first output device and the second output device.

28. A method, comprising:
   determining that a first desired recording of a first television program on a first recording device conflicts with a second desired recording of a second television program;
   presenting to a user a first option to determine availability of the first television program for download;

determining availability of the first television program for download in response to receiving input from the user that availability of the first television program for download is to be determined;
simultaneously presenting to the user the availability of the first television program for download and a cost associated with downloading the first television program;
presenting to the user a second option to download the first television program in response to determining the availability of the first television program for download;
downloading, to the first recording device, the first television program from a server in response to receiving input from the user that the first television program is to be downloaded;
performing the second desired recording of the second television program on the first recording device;
storing the recorded second television program and the downloaded first television program on the first recording device;
determining an available storage capacity of the first recording device and a second recording device in communication with the first recording device;
presenting to the user an indication of the available storage capacity of the first recording device and the second recording device; and
transferring at least a portion of the downloaded first television program and/or at least a portion of the recorded second television program from the first recording device to a second recording device to provide a same amount of storage space on the first recording device and the second recording after the transfer.

29. The method of claim 28, wherein the first recording device and the second recording device are each a digital video recorder.

30. The method of claim 28, further comprising: outputting, to the user, an indication of the conflict that the first desired recording of the first television program conflicts with the second desired recording of the second television program; and receiving user input indicating whether or not to cancel the second desired recording of the second television program.

31. The method of claim 28, wherein a request to perform the first desired recording of the first television program is received by the first recording device.

32. The method of claim 28, wherein a request to perform the first desired recording of the first television program is received by a website.

33. The method of claim 28, wherein all television programs stored on the first recording device are viewable from the second recording device, and wherein all television programs stored on the second recording device are viewable on the first recording device.

34. The method of claim 33, wherein a request to perform the first desired recording of the first television program is received by the second recording device.

35. The method of claim 33, wherein identities of all television programs stored on the first recording device and identities of all television programs stored on the second recording device are viewable in a merged list from the first recording device and the second recording device, wherein one or more of the television programs stored on the first recording device are different than the television programs stored on the second recording device.

36. The method of claim 28, further comprising recording the first television program when it is determined that the recording of the first television program does not conflict with another desired recording of a television program.

37. The method of claim 28, wherein the recording of the second television program is performed at a time that the second television program is broadcast from a signal source.

38. A method, comprising:
receiving a request to record a first television program on a first output device;
determining that recording the first television program conflicts with a scheduled recording of a second television program;
determining that the first television program is assigned a lower recording priority than the scheduled recording of the second television program, wherein the first television program and the second television program each relate to different television programs;
outputting a request for approval to search for the first television program for downloading thereof;
searching for the first television program for downloading thereof in response to receiving approval for the search;
outputting an indication of availability of the first television program for downloading thereof simultaneously with a cost associated with downloading the first television program;
outputting a request for approval to download the first television program to the first output device;
downloading, to the first output device, the first television program from a server via an Internet connection in response to receiving approval to download the first television program;
performing the scheduled recording of the second television program, the second television recording being recorded to the first output device;
storing the downloaded first television program and the recorded second television program on the first output device;
determining an available storage capacity of the first output device and a second output device;
outputting an indication of the available storage capacity of the first output device and the second output device; and
facilitating a transfer of at least a portion of the downloaded first television program and/or at least a portion of the recorded second television program from the first output device to the second output device to provide a same amount of storage space on the first output device and the second output after the transfer.

39. A method, comprising:
determining that a requested recording of a first television program on a first recording device conflicts with a previously scheduled recording of a second television program;
determining that the second television program is assigned a lower recording priority than the first television program, wherein the first television program and the second television program each relate to different television programs;
automatically performing on the first recording device the recording of the first television program based on the determination that the second television program is assigned a lower recording priority than the first television program;
after commencing the performing of the recording of the first television program, presenting to a user a request for approval to search for the second television program for downloading thereof;
searching for the second television program for downloading thereof in response to receiving, from the user, the approval to search;

outputting to the user an indication of availability of the second television program for downloading thereof;

presenting the user a request for approval to download the second television program to the first recording device;

downloading the second television program to the first recording device via a wireless network connection in response to receiving, from the user, the approval to download the second television program;

storing the recorded first television program and the downloaded second television program on the first recording device; and facilitating a transfer of at least a portion of the recorded first television program and/or at least a portion of the downloaded second television program from the first recording device to a second recording device to provide a same amount of storage space on the first recording device and the second recording device after the transfer, wherein the first recording device and the second recording device are each a digital video recorder.

* * * * *